(12) United States Patent
Benik

(10) Patent No.: US 8,429,913 B2
(45) Date of Patent: Apr. 30, 2013

(54) LIQUID DISPLACER ENGINE

(76) Inventor: Nicholas A Benik, Brooklyn, NY (US)

( * ) Notice: Subject to any disclaimer, the term of this patent is extended or adjusted under 35 U.S.C. 154(b) by 310 days.

(21) Appl. No.: 12/522,787

(22) PCT Filed: Dec. 24, 2008

(86) PCT No.: PCT/US2008/088301
§ 371 (c)(1),
(2), (4) Date: Jul. 10, 2009

(87) PCT Pub. No.: WO2009/110949
PCT Pub. Date: Sep. 11, 2009

(65) Prior Publication Data
US 2011/0000211 A1 Jan. 6, 2011

Related U.S. Application Data

(60) Provisional application No. 61/068,215, filed on Mar. 5, 2008, provisional application No. 61/106,615, filed on Oct. 20, 2008.

(51) Int. Cl.
*F03G 7/05* (2006.01)

(52) U.S. Cl.
USPC ............................................. 60/641.7

(58) Field of Classification Search ............. 60/641.1, 60/641.2, 641.6–641.8, 641.11–641.14, 670, 60/675, 641.15
See application file for complete search history.

(56) References Cited

U.S. PATENT DOCUMENTS

| 4,170,878 A | 10/1979 | Jahnig |
| 5,934,076 A | 8/1999 | Coney |
| 2002/0159892 A1 | 10/2002 | Zaptcioglu |
| 2007/0289303 A1* | 12/2007 | Prueitt ...................... 60/641.7 |

FOREIGN PATENT DOCUMENTS

WO 8805223 7/1988

* cited by examiner

*Primary Examiner* — Thomas Denion
*Assistant Examiner* — Jonathan Matthias

(57) ABSTRACT

A fluid-displacer engine which utilizes the thermodynamic Stirling cycle to extract energy from an external thermal gradient is disclosed. A working gas is disposed in each of two adjacent cylinders and is cycled from a hot region to a cold region of the respective cylinders by movement of a hot displacer fluid and a cold displacer fluid. Alternate heating and cooling of the working gas in each chamber causes the displacer fluid to flow from one cylinder to the other which, in turn allows one of the working gasses to expand and compresses the other. The flow of displacer fluids can be optimally controlled by the use of control valves. Energy can be extracted from the flow of the displacer fluids by the use of turbines in the displacer fluid flow paths.

23 Claims, 11 Drawing Sheets

LIQUID DISPLACER ENGINE

CROSS REFERENCE TO RELATED APPLICATIONS

This application claims priority to U.S. Provisional Application 61/068,215 filed on Mar. 5, 2008 which is hereby incorporated by reference and U.S. Provisional Application No. 61/106,615 filed on Oct. 20, 2008 which is hereby incorporated by reference.

FIELD OF THE INVENTION

The present invention relates to the field of energy conversion and more particularly to stirling engines for use in ocean thermal energy conversion systems.

BACKGROUND OF THE INVENTION

The stirling engine is a well known machine which utilizes the thermodynamic stirling cycle for converting thermal energy into mechanical or electrical energy. In a typical stirling engine, a working gas such as air, hydrogen or helium is alternately heated by a heat source and cooled by a heat sink. The expansion and compression of the working gas in response to the heating and cooling cycle is used to drive one or more pistons which in turn typically drive a shaft or drive gear system.

One well known type of stirling engine is the displacer-type stirling engine which is described with reference to FIGS. 1A-1D. Referring first to FIG. 1A, the displacer-type stirling engine 100 includes one power piston 102 and a displacer 104. A working gas 106 moves in a chamber 108 from one side of the displacer 104 to the other side of the displacer 104. Heating one side of the chamber 108 and cooling the other side of the chamber 108 causes repeated alternate expansion and contraction of the working gas 106 on alternate sides of the displacer 104 which in turn causes the displacer 104 to move alternately between the hot and the cold side of the chamber 108. The working piston 102 is tightly sealed in a secondary chamber 110 in communication with the displacer chamber 108 and is forced upward during a power stroke as the working gas 106 on the hot side of the chamber expands. The working piston 102 may be mechanically linked by a crank shaft, for example, to the displacer 104 which times and coordinates their relative movements. The mechanical linkage, not shown, causes the working piston 102 to compress the working gas 106 and provides a downward movement (FIG. 1B) to the displacer 104. Heat is extracted from the working gas 106 by a regenerator 112 which aids in the compression of working gas 106 on the cold side of the displacer and causes this gas to move around the displacer and re-fill the hot side of the chamber (FIG. 1C). The cool working gas is then heated by the hot side of the chamber (FIG. 1D) to drive the power piston 102 and move the displacer 104 downward. Energy is thereby extracted from the working gas in response to a temperature differential between the hot and cold sides of the chamber.

Various systems and methods have been known for extracting energy from the oceans and converting the oceans' thermal energy to other forms of useful energy. The field of ocean thermal energy conversion (OTEC) holds much promise as a renewable energy source when certain technical barriers are overcome. In order to extract energy from the oceans, an OTEC system must include portions that extend from the warm ocean surface to much colder waters in the ocean depths. Disadvantageously, displacer-type stirling engines have been heretofore found to be impractical for use in OTEC systems due to the large sized displacement chambers that would be required and the various mechanical linkages which must span large distances.

SUMMARY OF THE INVENTION

The present invention provides a fluid-displacer engine which utilizes the thermodynamic stirling cycle to extract energy from an external thermal gradient. A working gas is disposed in each of two adjacent cylinders and is cycled from a hot region to a cold region of the respective cylinders by movement of a hot displacer fluid and a cold displacer fluid. Alternate heating and cooling of the working gas in each chamber causes the displacer fluid to flow from one cylinder to the other which, in turn allows one of the working gasses to expand and compresses the other. The flow of displacer fluids can be optimally controlled by the use of control valves. Energy can be extracted from the flow of the displacer fluids by the use of turbines in the displacer fluid flow paths.

BRIEF DESCRIPTION OF THE DRAWING

The foregoing and other features and advantages of the present invention will be more fully understood from the following detailed description of illustrative embodiments, taken in conjunction with the accompanying drawings in which:

FIG. 4 is a schematic diagram of a fluid displacer including a pump and nozzle system for spraying cold displacer fluid through a working gas to more efficiently exchange heat there-between.

DETAILED DESCRIPTION

The various embodiments of the present invention overcome the disadvantages of previously known stirling engines and previously known OTEC systems by replacing the solid displacer of a displacer-type stirling engine with hot and cold displacer fluids which cycle between pairs of hot and cold displacer chambers.

Figure 1A:
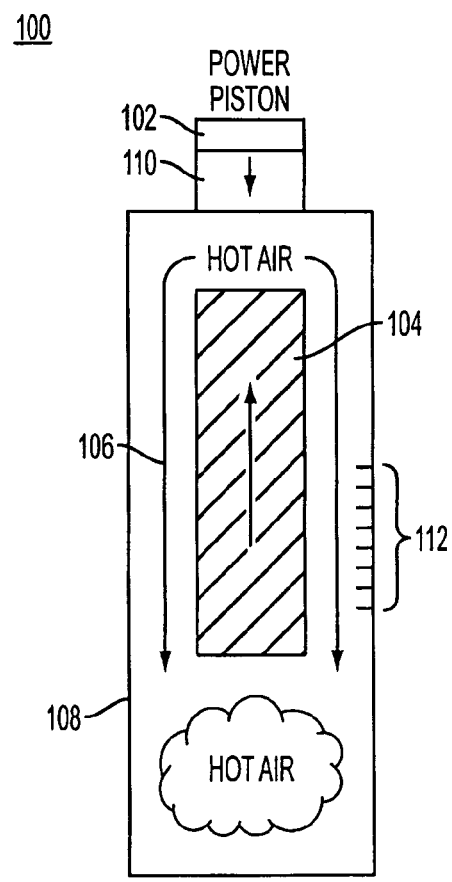
FIGS. 1A-1D are schematic diagrams of four operational states of a displacer-type stirling engine according to the PRIOR ART.
Figure 1B:
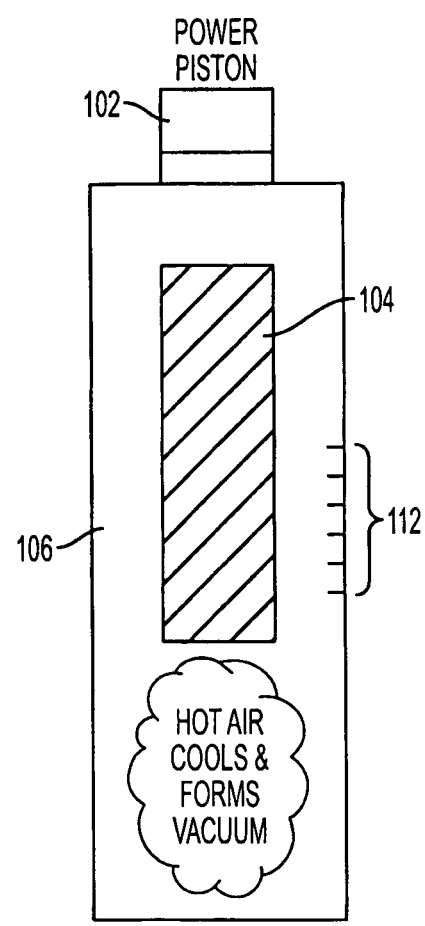
Figure 1C:
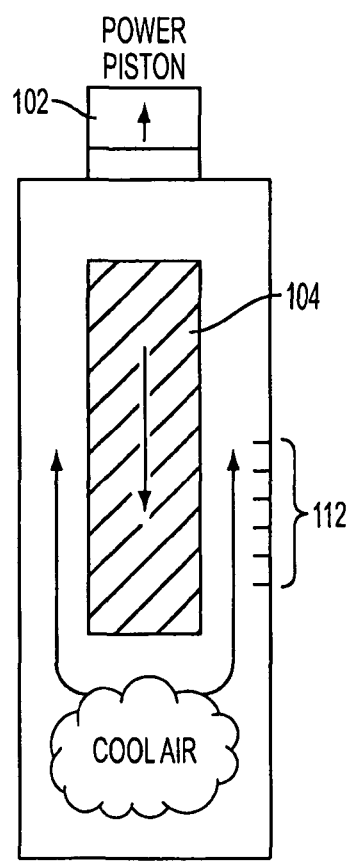
Figure 1D:
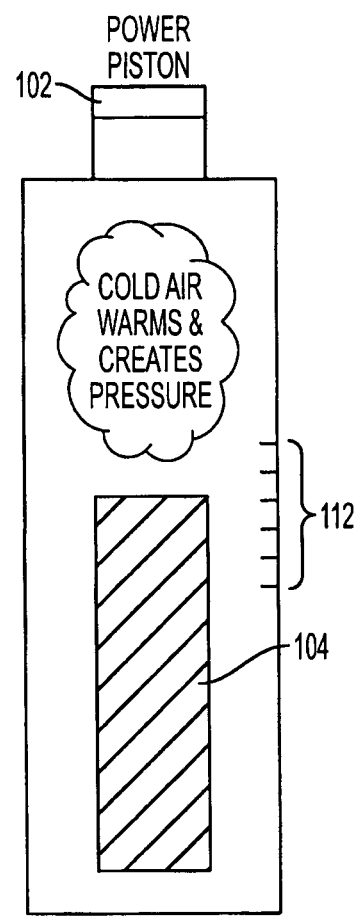
Figure 2:
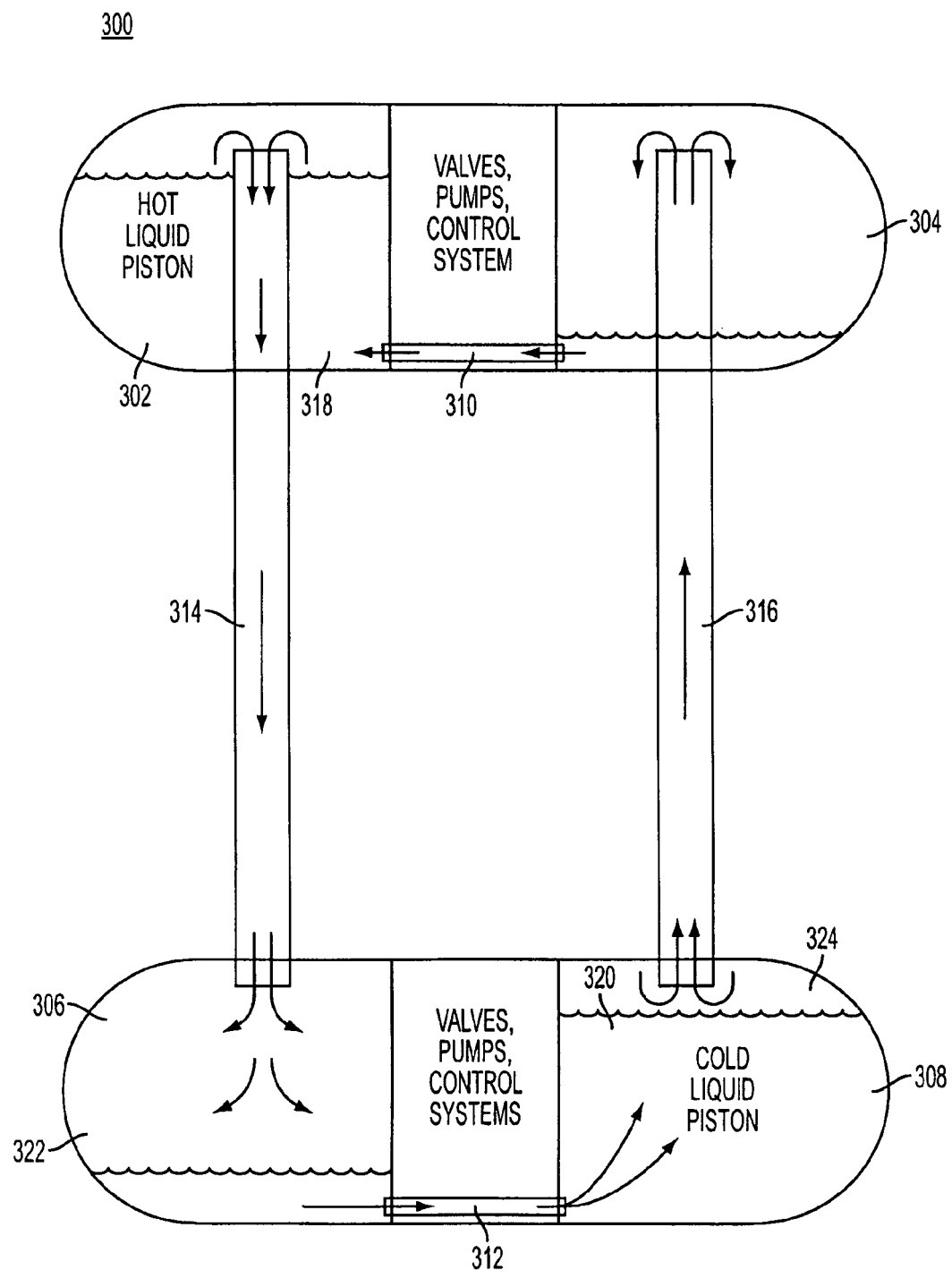
FIG. 2 is a schematic diagram of a fluid displacer engine according to an illustrative embodiment of the invention.

An illustrative embodiment of the invention is described with reference to FIG. 2. A fluid-displacer engine 300 includes a first hot fluid reservoir 302 connected to a second hot fluid reservoir 304 via a hot transfer pipe 310. A first cold fluid reservoir 306 is connected to a second cold fluid reservoir 308 via a cold transfer pipe 312. The first hot fluid reservoir 302 is connected to the first cold fluid reservoir 306 via a first gas conduit. The second hot fluid reservoir 304 is connected to the second cold fluid reservoir 308 via a second gas conduit 316.

A hot displacer fluid 318 is disposed within the first hot fluid reservoir 302 and second hot fluid reservoir 304 and can pass there-between via the hot transfer piper 310. A cold displacer fluid 320 is disposed within the first cold fluid reservoir 306 and the second cold fluid reservoir 308 and can travel there-between via the cold transfer pipe 312. The hot displacer fluid 318 is prevented from passing through the first gas conduit 314 and the second gas conduit 316 to either of the first cold fluid reservoir 306 or the second cold fluid reservoir 308. The cold displacer fluid 320 is prevented from passing through the first gas conduit 314 and the second gas conduit 316 to either of the first hot fluid reservoir 302 or the second hot fluid reservoir 304.

In the illustrative embodiment, the first gas conduit 314 and second gas conduit 316 are vertically oriented. The top end of each gas conduit 314, 316 are disposed above the highest hot fluid level in their respective hot fluid reservoirs 302, 304. The bottom end of each gas conduit 314, 316 are disposed above the highest cold fluid level in their respective cold fluid reservoirs 306, 308.

A first working gas 322 is free to travel between the first hot fluid reservoir 302 and the first cold fluid reservoir 306 via the first gas conduit 314. A second working gas 324 is free to travel between the second hot fluid reservoir 304 and the second cold fluid reservoir 308. The thermal gradient between the hot fluid reservoirs 302, 304 and the cold fluid reservoirs 306, 308 alternately increases and decreases pressure in each working gas 322, 324 causing the hot displacer fluid 318 to cycle between the hot fluid reservoirs 302, 304 and causing the cold displacer fluid 320 to cycle between the cold fluid reservoirs 306, 308. Flow control valves (not shown) may be used, for example, in transfer pipes 310, 312 to maintain the alternating directional flows of hot displacer fluid 318 and cold displacer fluid 320 and to allow time for a sufficient difference in pressure to develop between the first working gas 322 and the second working gas 324. Energy can be extracted from the flow of the displacer fluids by providing an energy extracting device in communication with the hot fluid flow and or cold fluid flow for providing output energy from the fluid displacement engine 300. Various energy extraction devices that are known in the art are suitable, for example a turbine generator (not shown) may be provided in the hot transfer pipe 310 and/or in the cold transfer pipe 312. An illustrative embodiment of the invention, which includes a system of control valves and turbine generators, is described with reference to FIGS. 3A-3D.

Figure 3A:
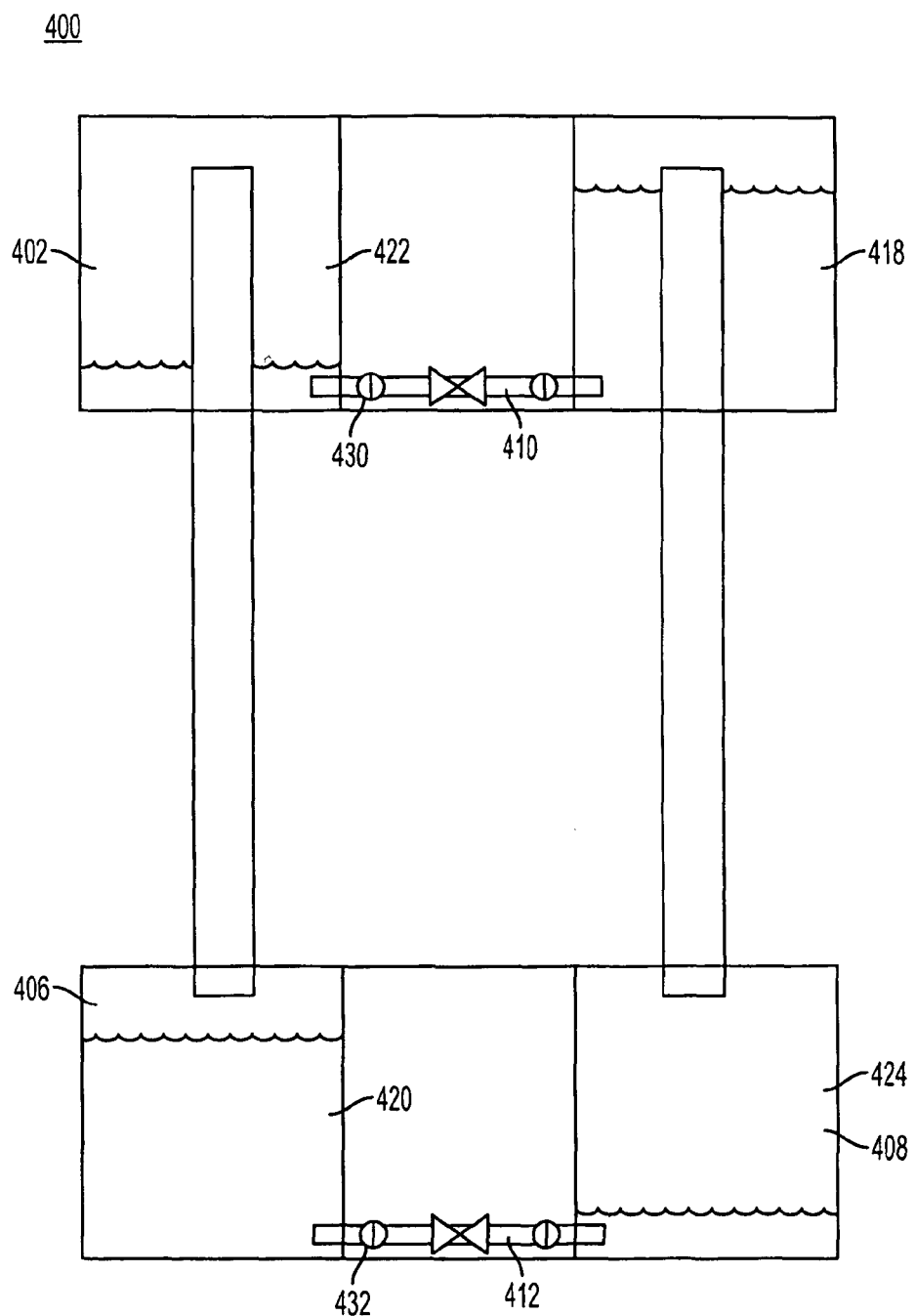
FIG. 3A-3D are schematic diagrams of four operational states of a fluid displacer engine according to an illustrative embodiment of the invention.

In FIG. 3A, a fluid displacer engine 400 is shown wherein a first working gas 422 has been pushed into a first hot fluid reservoir 402 from the colder environment of a first cold fluid reservoir 406. The hotter environment of the first hot fluid reservoir 402 adds heat to the first working gas 422. A second working gas 424 has been pushed into a second cold fluid reservoir 408 from the warmer environment of the second hot fluid reservoir 304. The colder environment of the second cold fluid reservoir 408 extracts heat from the second working gas 424. A first valve 430 in the hot transfer pipe 410 is closed and a second valve 432 in the cold transfer pipe 412 is closed which prevents flow of the hot displacer fluid 418 and cold displacer fluid 420 and thereby maintains a constant volume for the first working gas 422 and second working gas 424. Pressure in the first working gas 422 begins to increase as it warms and pressure in the second working gas 424 begins to decrease as it cools.

Figure 3B:
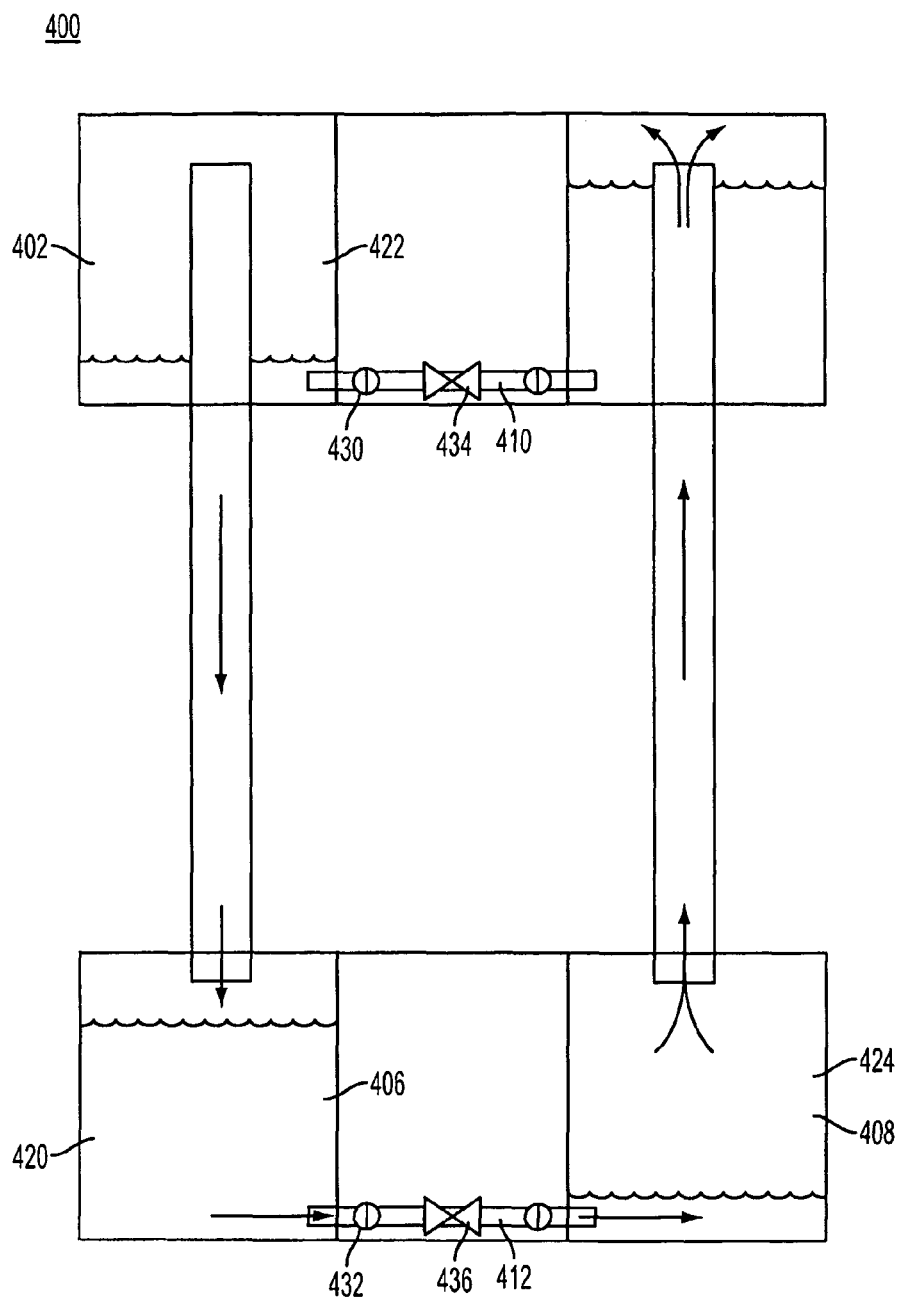

In FIG. 3B the next state of the fluid displacer engine 400 is shown wherein the first working gas 422, having been heated in the first hot fluid reservoir 402, has a higher pressure than the second working gas 424 which has been cooled in the second cold fluid reservoir 408. The second valve 432 is then open and the first valve 430 remains closed. The pressure differential between the first and second working gasses 422, 424 causes cold displacer fluid 420 to flow through the cold transfer pipe 412 from the first cold fluid reservoir 406 to the second cold fluid reservoir 408 until the pressure of the first working gas 422 equals the pressure of the second working gas 424.

In the illustrative embodiment, a first turbine 434 is disposed in the hot transfer pipe 410 and a second turbine 436 is disposed in the cold transfer pipe 412. Flow of the cold displacer fluid 420 through the cold transfer pipe 412 causes rotation of the second turbine 436 which can be used to drive a generator or other mechanical device to extract energy from the fluid displacer engine 400.

Figure 3C:
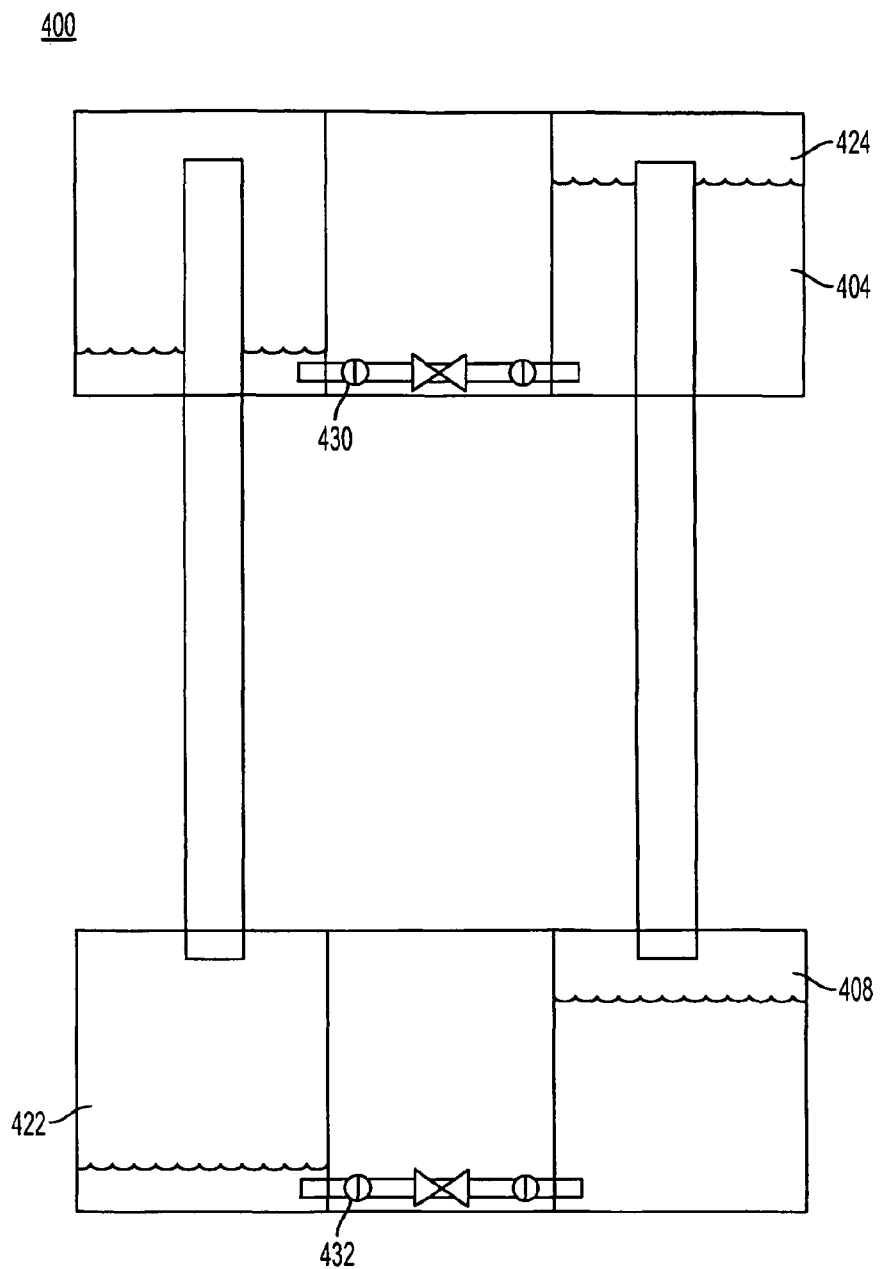

In FIG. 3C, the next state of the fluid displacer engine 400 is shown wherein the first valve 430 and second valve 432 are both closed. The second working gas 424, having been compressed and displaced from the second cold fluid reservoir 408 to the second hot fluid reservoir 404 by the flow of the cold displacer fluid 420, is heated by the warmer environment of the second hot fluid reservoir 404 which increases the pressure of the second working gas 424. The first working gas 422, having been expanded and displaced from the first hot fluid reservoir 402 to the first cold fluid reservoir 406, is cooled by the cooler environment of the second cold fluid reservoir 406 which decreases the pressure of the first working gas 422.

Figure 3D:
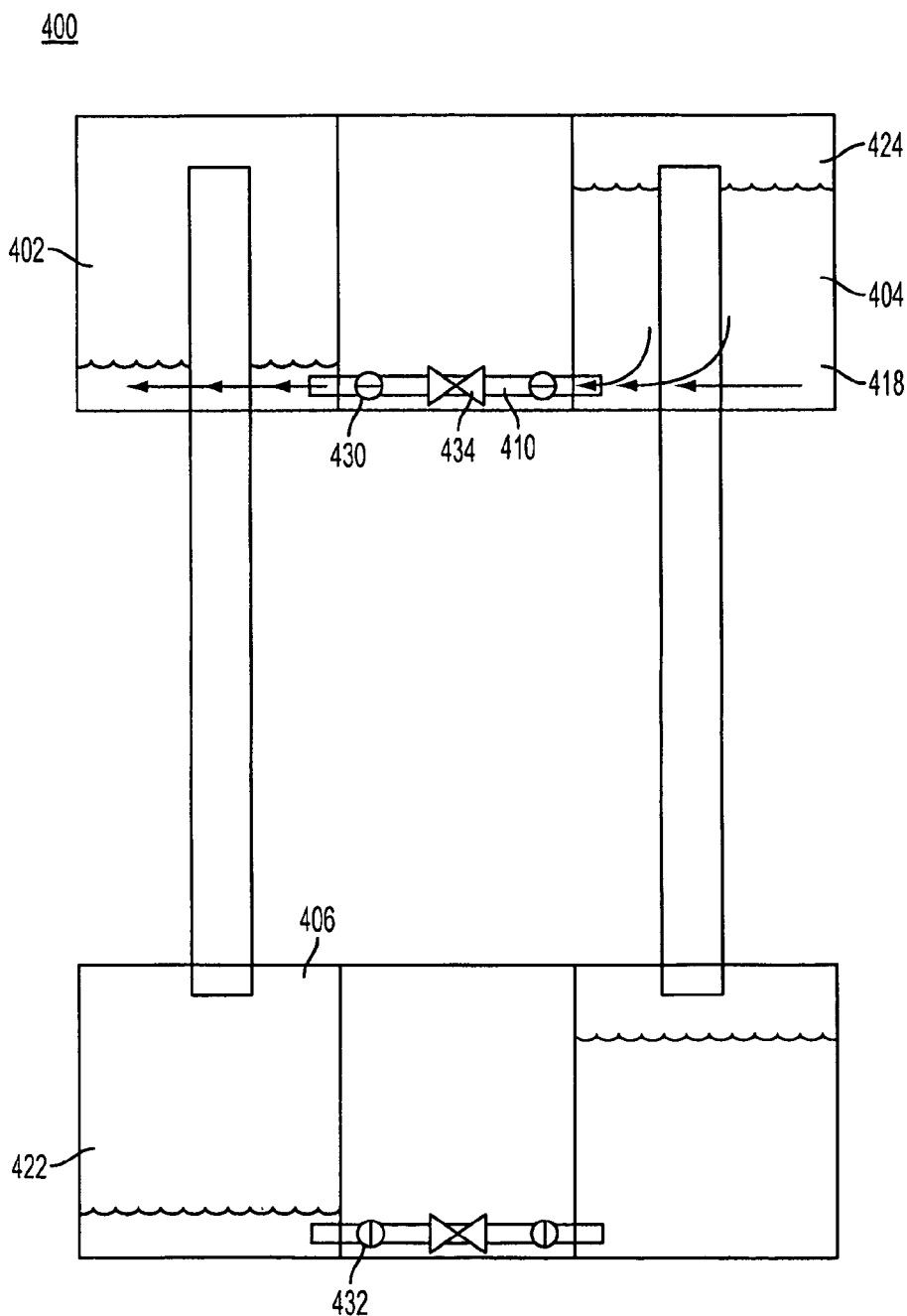

In FIG. 3D, the next state of the fluid displacer engine 400 is shown wherein the second working gas 424, having been heated in the second hot fluid reservoir 404, has a higher pressure than the first working gas 422 which has been cooled in the first cold fluid reservoir 406. The first valve is then open and the second valve 432 remains closed. The pressure differential between the first and second working gasses 422, 424 causes the hot displacer fluid 418 to flow through the hot transfer pipe 410 from the second hot fluid reservoir 404 to the first hot fluid reservoir 402. Flow of the hot displacer fluid 418 from through the hot transfer pipe 410 causes rotation of the first turbine 434 to extract energy from the fluid displacer engine 400.

The cycle describe with reference to FIGS. 3A-3D continuously repeats, reversing direction for each new cycle.

In an illustrative embodiment, the inventive fluid displacer engine is employed in the context of an ocean thermal energy conversion (OTEC) system. In this embodiment, the hot fluid reservoirs are disposed at or near the ocean surface and the cold fluid reservoirs are disposed in the ocean depths, for example about 200 meters deep, where the ocean water is substantially cooler to take advantage of the natural temperature gradient of the ocean, and to thereby extract thermal energy from the ocean. The temperature gradient between the hot and cold fluid reservoirs can be further increased by maximizing the solar energy absorption of the hot fluid chambers.

The efficiency of a fluid displacer engine according to the various embodiments of the invention can be improved by increasing the heating and cooling rates of the working gas. The structure of the hot and cold fluid reservoirs and/or the first gas conduit and second gas conduit may be designed to efficiently exchange heat with the external environment by maximizing their surface area, for example, or by utilizing devices such as heat sinks and heat pipes in the interface between the working gases (and/or fluids) and the external environment.

Figure 4:
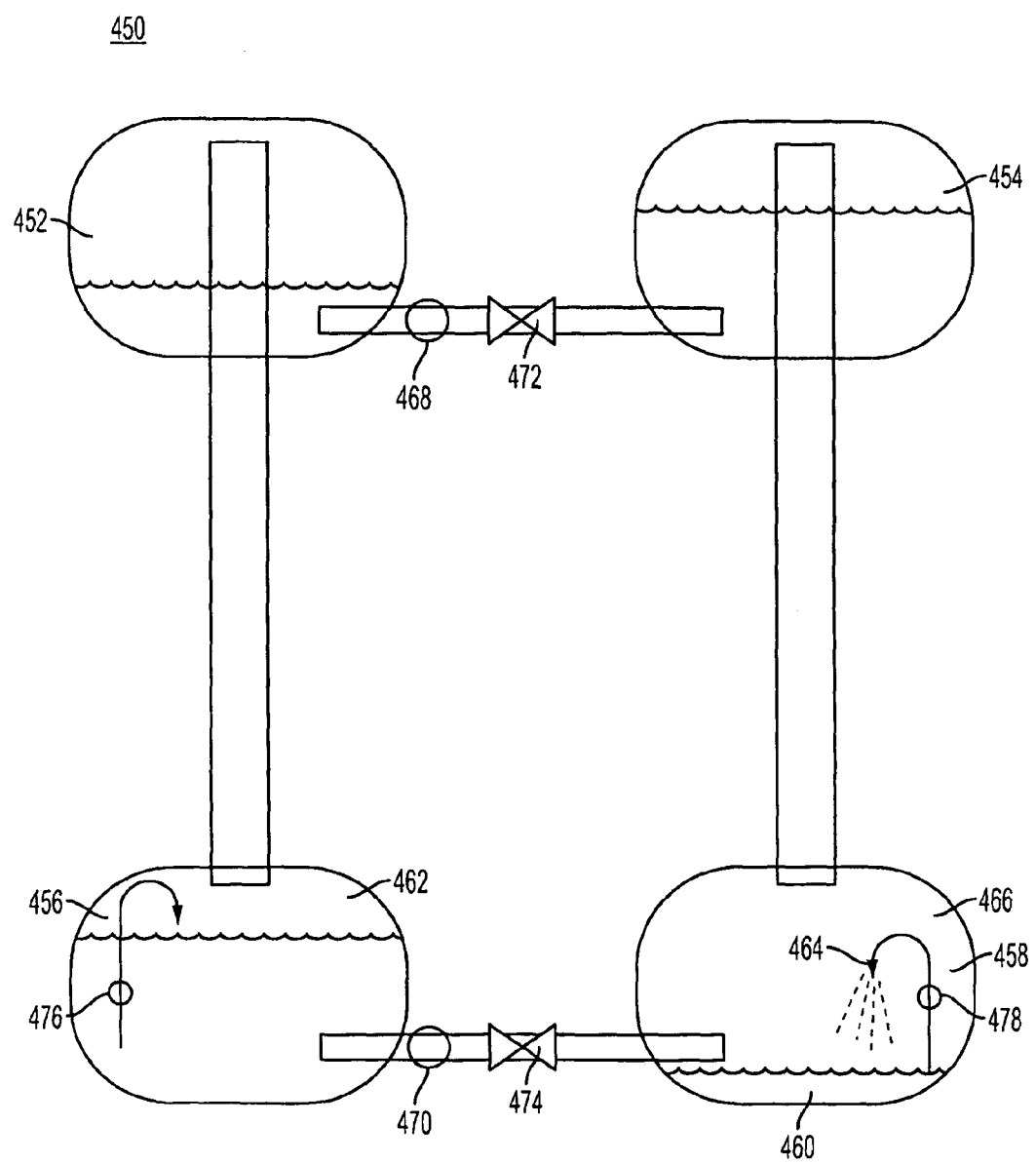

A method of increasing the efficiency of a fluid displacer engine according to an illustrative embodiment of the invention is described with reference to FIG. 4 wherein the cold working fluid 460 of the fluid displacer engine 450 is circulated within one or both of the cold fluid reservoirs 456, 458 by pumping the fluid through a nozzle 462, 464. The spray of cold working fluid from the nozzle 462, 464 increases the rate of cooling of the working gas 466 through which it is sprayed. The nozzle 462, 464 is designed to spray droplets of the displacer fluid through the working gas without causing the displacer fluid to evaporate in the working gas. Circulator pumps 476, 478 are externally connected by means not shown to receive power and control signals as will be apparent to persons having ordinary skill in the art so that the appropriate circulator pump 476, 478 is energized at the time when it is desirable to cool the working gas in its respective cold fluid reservoir 456, 458. Valves 468, 470 are operated as described hereinbefore with reference to the embodiment of FIGS. 3A-3D. Turbines 472, 474 or other energy extraction devices can be used to extract energy from the working fluids as described hereinbefore with reference to FIGS. 3A-3D.

Although circulator pumps 476, 478 are shown as circulating displacer fluid entirely within a respective displacer fluid reservoir, various embodiments of the present invention (not shown) include a circulation path that extends out of the displacer fluid chamber, then optionally through a heat exchanger and back into the respective displacer fluid reservoir. In at least one embodiment, each displacer fluid reservoir is equipped with a circulator pump which passes the displacer fluid through a corresponding heat exchanger and then sprays the displacer fluid, via a nozzle, for example, back into the displacer fluid reservoir.

Figure 5:
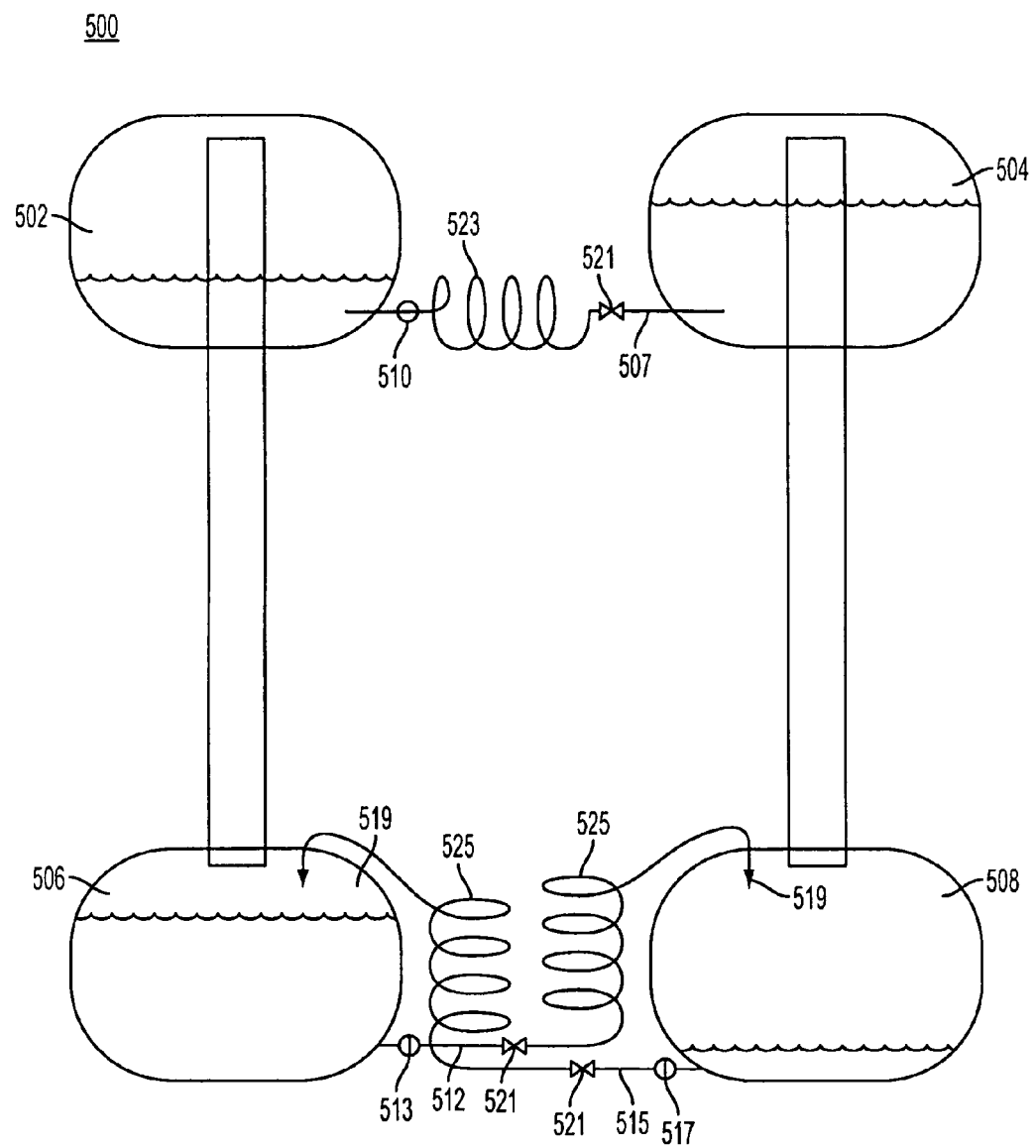
FIG. 5 is a schematic diagram of a fluid displacer engine including displacer fluid nozzles and heat exchangers for more efficient operation according to an illustrative embodiment of the invention.

Another method of increasing the efficiency of a fluid displacer engine according to an illustrative embodiment of the invention is described with reference to FIG. 5 in which the cold displacer fluid passes through a nozzle and is sprayed into the appropriate cold fluid reservoir to more efficiently cool the working gas. The fluid displacer engine 500 includes a first hot fluid reservoir 502 connected to a second hot fluid reservoir via a hot fluid transfer pipe 507 and hot fluid valve 510. A first cold fluid reservoir 506 is connected to a second cold fluid reservoir 508 via a first cold fluid transfer pipe 512 and first cold fluid valve 513. The first cold fluid reservoir 506 is also connected to the second cold fluid reservoir 508 via a second cold fluid transfer pipe 515 and a second cold fluid valve 517.

The embodiment shown in FIG. 5 performs in essentially the same manner as the embodiment described with reference to FIG. 3 except that the valves 513 and 517 are controlled, by a controller for example, to enforce unidirectional flow from an input end of one cold transfer pipe to an output end of the same transfer pipe, while closing flow through the other cold transfer pipe. Each cold fluid transfer pipe 512, 515 is terminated at its output end with a nozzle 519 which causes the displacer fluid to be sprayed into its respective chamber and thereby more efficiently absorb heat from the working gas. The nozzle is designed to spray droplets of the displacer fluid through the working gas without causing the displacer fluid to evaporate in the working gas.

In the illustrative embodiment, a turbine 521 may be disposed in the hot transfer pipe 507, 510 and in each cold transfer pipe 512, 515. Flow of the displacer fluid through an appropriate transfer pipe causes rotation of the respective turbine which can be used to drive a generator or other mechanical device to extract energy from the fluid displacer engine 500.

The efficiency of the fluid displacer engine 500 may be further enhanced by preheating the hot displacer fluid and/or by pre-cooling the cold displacer fluid during transfer of the respective displacer fluid to its appropriate fluid reservoir. In an illustrative embodiment, a pre-heating coil 523 is disposed in the hot transfer pipe 507 and a pre-cooling coil 525 is disposed in each of the cold transfer pipes 512, 515. Alternatively or in addition to the pre-heating coil 523 and pre-cooling coil 525, various other pre-heating and/or pre-cooling mechanisms may be used to preheat and/or pre-cool the displacer fluids as they are transferred into their appropriate fluid reservoir.

The various valves disclosed herein may be controlled manually or by any number of different controller types such as a mechanical linkage, a micro controller or other microprocessor system, for example. Persons having ordinary skill in the art should appreciate that use of computer controlled valves and pumps can provide timing of displacer fluid transfer to optimize heat transfer between a working gas and the displacer fluid. In one embodiment, for example, the transfer of hot and cold displacer fluid is aided by the use of pumps to assist in the flow of displacer fluid from one displacer fluid reservoir to the other corresponding displacer fluid reservoir. In this embodiment computer controlled valves provide precise timing to effect optimal heat transfer between the working gas and the displacer fluid. In addition to the cold displacer fluid being sprayed through a nozzle in the working gas, the use of computer controlled valves and pumps can be combined with the use of nozzles in the hot displacer chamber for spraying hot displacer fluid through the working gas.

The hot and cold displacer fluids may be the same or different fluids and preferably have a high heat capacity. Examples of fluids that would be suitable for use as hot and cold displacer fluids according to the various illustrative embodiments of the invention include water or virtually any liquid which will not change state in the presence of the working gas given the working temperatures and pressures of the fluid displacement engine.

The first and second working gas may be the same or different types of gas and preferable have a high heat capacity. Examples of gasses that would be suitable for use as a working gas according to the various illustrative embodiments of the invention include air, nitrogen, hydrogen, and helium, for example.

While the invention has been described with reference to illustrative embodiments, it will be understood by those skilled in the art that various other changes, omissions, and/or additions may be made and substantial equivalents may be substituted for elements thereof without departing from the spirit and scope of the invention. In addition, many modifications may be made to adapt a particular situation or material to the teaching of the invention without departing from the scope thereof. Therefore, it is intended that the invention not be limited to the particular embodiment disclosed for carrying out this invention, but that the invention will include all embodiments, falling within the scope of the appended claims. Moreover, unless specifically stated any use of the terms first, second, etc., do not denote any order of importance, but rather the terms first, second, etc. are used to distinguish one element from another.

What is claimed is:

1. An energy conversion apparatus comprising:
   a first hot fluid reservoir connected to a second hot fluid reservoir via a hot transfer pipe;
   a first cold fluid reservoir connected to a second cold fluid reservoir via a cold transfer pipe;
   a first gas conduit connecting the first hot fluid reservoir to the first cold fluid reservoir;
   a second gas conduit connecting the second hot fluid reservoir to the second cold fluid reservoir;
   a hot displacer fluid disposed within the first hot fluid reservoir, second hot fluid reservoir and the hot transfer pipe;

a cold displacer fluid disposed within the first cold fluid reservoir, the second cold fluid reservoir and the cold transfer pipe;

a first working gas exerting a first gas pressure in the first hot fluid reservoir and in the first cold fluid reservoir;

a second working gas exerting a second gas pressure in the second hot fluid reservoir and in the second cold fluid reservoir;

wherein the first hot fluid reservoir and second hot fluid reservoir are vertically separated from the first cold fluid reservoir and second cold fluid reservoir by a natural vertical thermal gradient in a natural body of water; and at least one energy extraction device adapted to convert a flow of either the hot displacer fluid or cold displacer fluid into energy for output from the energy conversion apparatus.

2. The energy conversion apparatus of claim 1, wherein the thermal gradient alternately increases and decreases pressure in each working gas causing the hot displacer fluid to cycle between the hot fluid reservoirs and causing the cold displacer fluid to cycle between the cold fluid reservoirs.

3. The energy conversion apparatus of claim 1, wherein the first gas conduit and second gas conduit are arranged to prevent the hot displacer fluid from passing to the first cold fluid reservoir and the second cold fluid reservoir, and to prevent the cold displacer fluid from passing to the first hot fluid reservoir and the second hot fluid reservoir.

4. The energy conversion apparatus of claim 3, wherein the first gas conduit and second gas conduit are vertically oriented such that a top end of each of the gas conduits is disposed above a highest hot fluid level in a respective hot fluid reservoirs; and wherein a bottom end of each gas conduit is disposed above the highest cold fluid level in a respective cold fluid reservoir.

5. The energy conversion apparatus of claim 1, comprising:
a first flow control valves disposed in the hot transfer pipe; and
a second flow control valve disposed in the cold transfer pipe.

6. The energy conversion apparatus of claim 5, comprising:
a controller in communication with said first flow control valve and said second flow control valve, the controller being adapted to open and close the first flow control valve and the second flow control valve at times determined to maintain alternating directional flows of hot displacer fluid and cold displacer fluid.

7. The energy conversion apparatus of claim 6, wherein the controller is adapted to allow time for a sufficient difference in pressure to develop between the first working gas and the second working gas to cause a flow of the hot displacer fluid or the cold displacer fluid.

8. The energy conversion apparatus of claim 1, wherein said at least one energy extraction device is disposed in at least one of the hot transfer pipe and the cold transfer pipe.

9. The energy conversion apparatus of claim 1, comprising:
at least one nozzle disposed on at least one of the hot transfer pipe and cold transfer pipe, wherein the nozzle is arranged to spray the respective hot or cold displacer fluid through the respective first or second working gas in the respective hot fluid reservoir or cold fluid reservoir.

10. The energy conversion apparatus of claim 1, comprising:
a pre-cooler in communication with the cold displacer fluid and adapted to extract heat from the cold displacer fluid.

11. The energy conversion apparatus of claim 1, comprising:
a pre-heater in communication with the hot displacer fluid and adapted to add heat to the hot displacer fluid.

12. The energy conversion apparatus of claim 1, wherein the energy extraction device comprises a turbine generator.

13. The energy conversion apparatus of claim 1, comprising
a nozzle in communication with a circulator pump, said nozzle and circulator pump being arranged to circulate said cold displacer fluid within one or both of said cold fluid reservoirs such that said cold displacer fluid is sprayed through said working gas when said working gas is being cooled by said cold displacer fluid.

14. An energy conversion apparatus comprising:
a first hot fluid reservoir connected to a second hot fluid reservoir via a first hot fluid transfer pipe having a first hot fluid valve disposed therein and via a second hot fluid transfer pipe having a second hot fluid valve disposed therein, wherein each of said hot fluid transfer pipes has an output end terminated with a spray nozzle;

a first cold fluid reservoir connected to a second cold fluid reservoir via a first cold fluid transfer pipe having a first cold fluid valve disposed therein and via a second cold fluid transfer pipe having and a second cold fluid valve disposed therein, wherein each of said cold fluid transfer pipes has an output end terminated with a spray nozzle;

a first gas conduit connecting the first hot fluid reservoir to the first cold fluid reservoir;

a second gas conduit connecting the second hot fluid reservoir to the second cold fluid reservoir;

a hot displacer fluid disposed within the first hot fluid reservoir, second hot fluid reservoir and at least one of the first hot transfer pipe or the second hot transfer pipe;

a cold displacer fluid disposed within the first cold fluid reservoir, the second cold fluid reservoir and at least one of the first cold transfer pipe or the second cold transfer pipe;

a first working gas exerting a first gas pressure in the first hot fluid reservoir and in the first cold fluid reservoir;

a second working gas exerting a second gas pressure in the second hot fluid reservoir and in the second cold fluid reservoir;

wherein the first hot fluid reservoir and second hot fluid reservoir are vertically separated from the first cold fluid reservoir and second cold fluid reservoir by a natural vertical thermal gradient in a natural body of water;

a controller in communication with said first hot fluid valve, said second hot fluid valve, said first cold fluid valve and said second cold fluid valve the controller being adapted to open and close the appropriate first and second hot and cold fluid valve(s) at times determined to maintain alternating directional flows of hot displacer fluid and cold displacer fluid, and to enforce unidirectional flow in each of the transfer pipes toward their respective output end and through respective spray nozzle; and at least one energy extraction device adapted to convert a flow of either the first displacer fluid or second displacer fluid into energy for output from the energy conversion apparatus.

15. The energy conversion apparatus of claim 14, wherein the thermal gradient alternately increases and decreases pressure in each working gas causing the hot displacer fluid to cycle between the hot fluid reservoirs and causing the cold displacer fluid to cycle between the cold fluid reservoirs.

16. The energy conversion apparatus of claim 14, wherein the first gas conduit and second gas conduit are arranged to prevent the hot displacer fluid from passing to the first cold fluid reservoir and the second cold fluid reservoir, and to prevent the cold displacer fluid from passing to the first hot fluid reservoir and the second hot fluid reservoir.

17. The energy conversion apparatus of claim 14, wherein the controller is adapted to allow time for a sufficient difference in pressure to develop between the first working gas and the second working gas to cause a spray of the hot displacer fluid or the cold displacer fluid through a respective one of said nozzles.

18. The energy conversion apparatus of claim 14, comprising:
a pre-cooler in communication with the cold displacer fluid and adapted to extract heat from the cold displacer fluid.

19. The energy conversion apparatus of claim 14 comprising:
a pre-heater in communication with the hot displacer fluid and adapted to add heat to the hot displacer fluid.

20. A method of generating energy comprising:
connecting a first hot fluid reservoir to a second hot fluid reservoir via a hot transfer pipe;
connecting a first cold fluid reservoir to a second cold fluid reservoir via a cold transfer pipe;
connecting the first hot fluid reservoir to the first cold fluid reservoir via a first gas conduit;
connecting the second hot fluid reservoir to the second cold fluid reservoir via a second gas conduit;
disposing a hot displacer fluid within the first hot fluid reservoir the second hot fluid reservoir and the hot transfer pipe;
disposing a cold displacer fluid within the first cold fluid reservoir, the second cold fluid reservoir and the cold transfer pipe;
providing a first working gas exerting a first gas pressure in the first hot fluid reservoir and in the first cold fluid reservoir;
providing a second working gas exerting a second gas pressure in the second hot fluid reservoir and in the second cold fluid reservoir;
wherein the first hot fluid reservoir and second hot fluid reservoir are vertically separated from the first cold fluid reservoir and second cold fluid reservoir by a natural vertical thermal gradient in a natural body of water; and
converting a flow of either the hot displacer fluid or cold displacer fluid into energy for output from the energy conversion apparatus.

21. The method of claim 20, further comprising:
spraying said cold displacer fluid through said working gas when said working gas is being cooled by said cold displacer fluid.

22. The method of claim 20, further comprising:
passing said cold displacer fluid through a heat exchanger.

23. The method of claim 21, further comprising:
passing said hot displacer fluid through a heat exchanger.

* * * * *